US008904787B2

(12) United States Patent
Styles et al.

(10) Patent No.: US 8,904,787 B2
(45) Date of Patent: Dec. 9, 2014

(54) FIXED RATE EGR SYSTEM

(75) Inventors: Daniel Joseph Styles, Canton, MI (US);
James Hilditch, Canton, MI (US);
William Charles Ruona, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 228 days.

(21) Appl. No.: 13/239,137

(22) Filed: Sep. 21, 2011

(65) Prior Publication Data

US 2012/0023937 A1   Feb. 2, 2012

(51) Int. Cl.
*F02D 41/00* (2006.01)
*F02D 9/02* (2006.01)
*F02M 25/07* (2006.01)
*F02B 37/007* (2006.01)
*F02B 29/04* (2006.01)

(52) U.S. Cl.
CPC ............... *F02D 41/005* (2013.01); *F02D 9/02* (2013.01); *F02D 41/0065* (2013.01); *F02D 41/0077* (2013.01); *F02M 25/0707* (2013.01); *F02M 25/0709* (2013.01); *F02M 25/0711* (2013.01); *F02M 25/0732* (2013.01); *F02M 25/0744* (2013.01); *F02M 25/0748* (2013.01); *F02B 29/0406* (2013.01); *F02B 37/007* (2013.01); *F02D 2041/0017* (2013.01); *F02M 25/0731* (2013.01); *Y02T 10/47* (2013.01)
USPC ........................................................ 60/605.2

(58) Field of Classification Search
USPC ........................... 60/605.2; 123/568.2, 568.12
See application file for complete search history.

(56) References Cited

U.S. PATENT DOCUMENTS

| 4,398,525 | A | * | 8/1983 | Ahrns et al. | 123/568.32 |
|---|---|---|---|---|---|
| 4,461,263 | A | | 7/1984 | Hasegawa | |
| 5,802,846 | A | * | 9/1998 | Bailey | 60/278 |
| 2005/0022511 | A1 | | 2/2005 | Miura | |
| 2007/0175215 | A1 | * | 8/2007 | Rowells | 60/605.2 |
| 2007/0246028 | A1 | * | 10/2007 | Fujita et al. | 123/568.12 |
| 2009/0205617 | A1 | * | 8/2009 | Tonetti et al. | 123/568.18 |
| 2009/0283077 | A1 | | 11/2009 | Murata et al. | |
| 2010/0000213 | A1 | | 1/2010 | Onishi et al. | |

(Continued)

FOREIGN PATENT DOCUMENTS

| DE | 2353908 A1 | 5/1974 | |
|---|---|---|---|
| EP | 0972925 A2 | 1/2000 | |
| WO | 2008152483 A1 | 12/2008 | |
| WO | WO 2009148917 A2 * | 12/2009 | F02M 25/07 |

OTHER PUBLICATIONS

ISA European Patent Office, Search Report of PCT/US2011/059170, May 30, 2012, Netherlands, 5 pages.

(Continued)

*Primary Examiner* — Mary A Davis
(74) *Attorney, Agent, or Firm* — Julia Voutyras; Alleman Hall McCoy Russell & Tuttle LLP

(57) ABSTRACT

A method is provided for controlling EGR flow in turbocharged engine. The method comprises operating a low-pressure exhaust gas recirculation (LP-EGR) system at a fixed EGR percentage rate of fresh airflow from mid-load down to a minimum engine load, even as load changes. In this way, errors in the delivered LP-EGR rate during transient conditions may be alleviated by providing a fixed EGR percentage of fresh airflow at all engine loads within a fixed mode range.

18 Claims, 9 Drawing Sheets

(56) References Cited

U.S. PATENT DOCUMENTS

| | | |
|---|---|---|
| 2010/0031939 A1* | 2/2010 | Ono .............................. 60/605.2 |
| 2010/0050999 A1 | 3/2010 | Murata et al. |
| 2010/0211293 A1* | 8/2010 | Yamada et al. ................ 701/108 |
| 2011/0088674 A1* | 4/2011 | Shutty et al. ............. 123/568.21 |
| 2011/0146268 A1* | 6/2011 | Hepburn et al. ................ 60/602 |
| 2011/0162626 A1* | 7/2011 | Styles et al. ............. 123/568.21 |
| 2011/0283699 A1* | 11/2011 | Surnilla et al. ............... 60/605.2 |
| 2012/0031381 A1* | 2/2012 | Styles et al. ............. 123/568.12 |
| 2012/0046854 A1* | 2/2012 | Sangkyu et al. ............... 701/108 |
| 2012/0144806 A1* | 6/2012 | Hamamatsu et al. ........... 60/278 |

OTHER PUBLICATIONS

ISA European Patent Office, Written Opinion of PCT/US2011/059170, May 30, 2012, Netherlands, 6 pages.

* cited by examiner

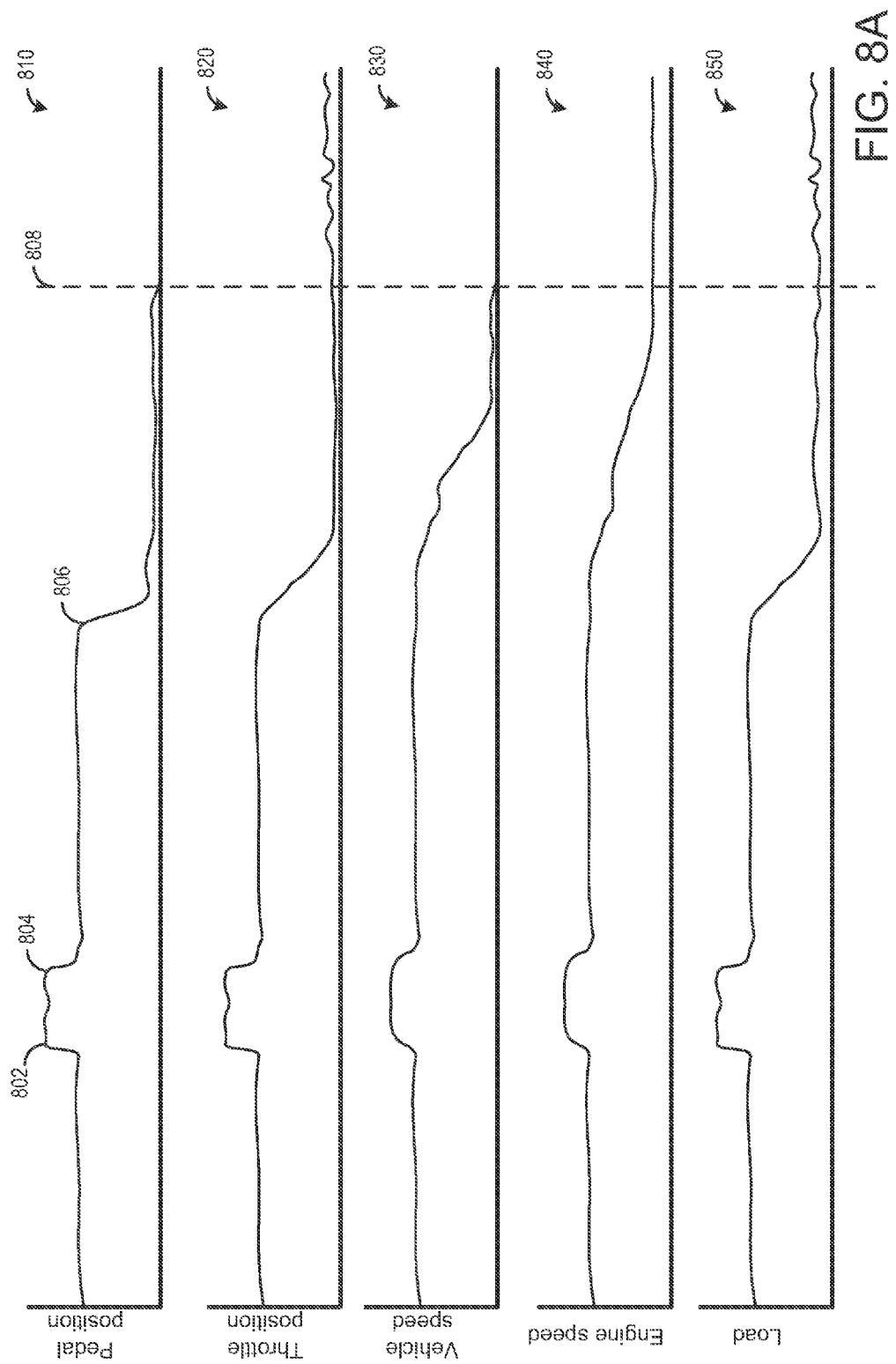

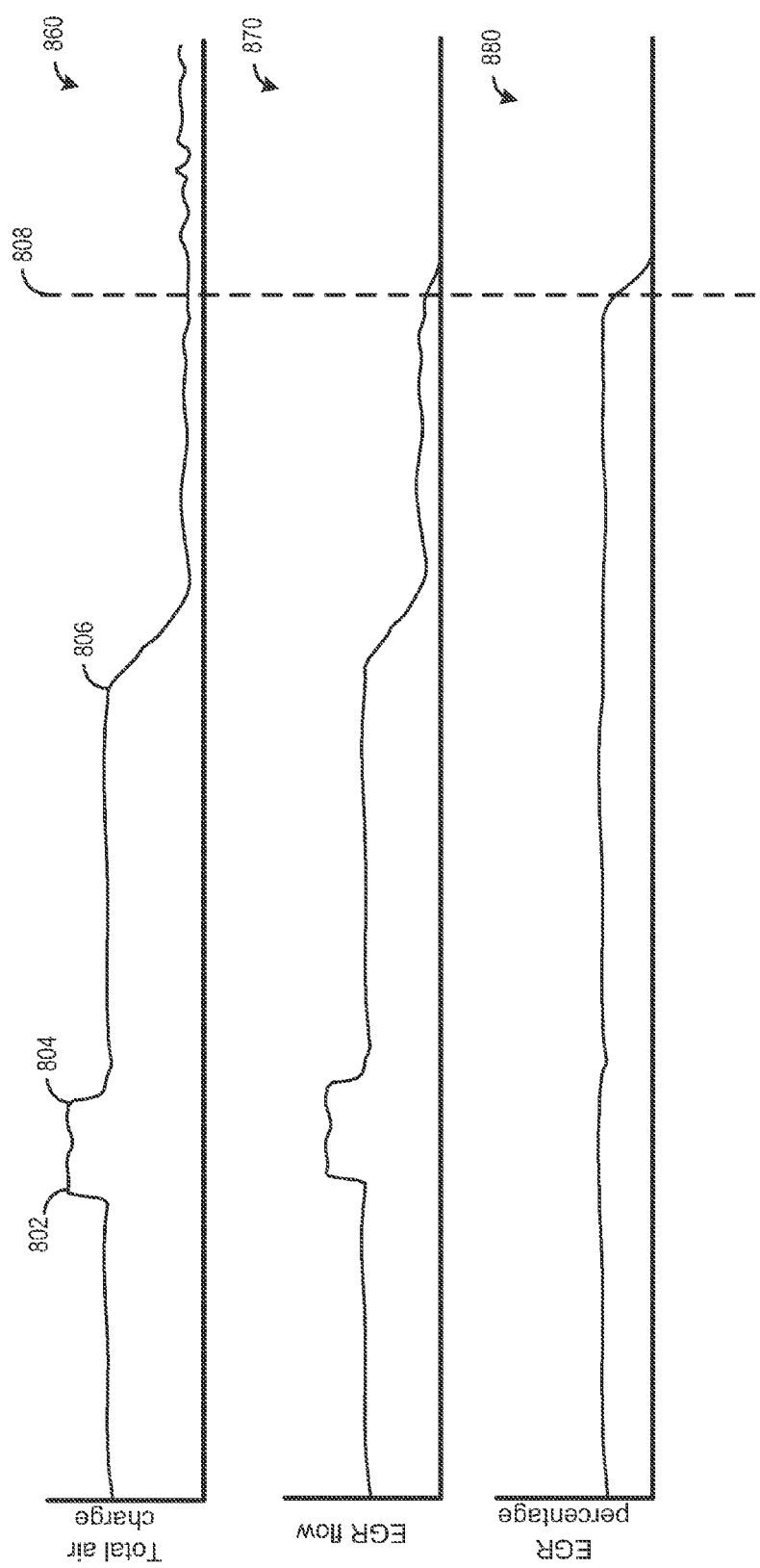

FIXED RATE EGR SYSTEM

FIELD

The present application relates to control of an exhaust gas recirculation system in a motor vehicle.

BACKGROUND AND SUMMARY

Exhaust gas recirculation (EGR) systems divert a portion of the exhaust gases back to the intake to cool combustion temperatures and reduce throttling losses, thus improving vehicle emissions and fuel economy. In turbocharged engines, an EGR system may include a low-pressure EGR (LP-EGR) circuit, a high-pressure EGR (HP-EGR) circuit, or both. The LP-EGR circuit diverts exhaust gases after the gases pass through the turbine of the turbocharger and injects the gases before the compressor, while the HP-EGR circuit diverts exhaust gases before the turbine and injects the gases after the intake throttle. Traditionally, the amount of LP-EGR and/or HP-EGR routed through the EGR system is measured and adjusted based on engine speed and load during engine operation to maintain desirable combustion stability of the engine while providing emissions and fuel economy benefits.

However, the inventors herein have recognized an issue with the above approach. The LP-EGR circuit has a long transport delay, as the exhaust gases must travel through the turbo compressor, high pressure air induction plumbing, charge air cooler, and intake manifold before reaching the combustion chamber. As a result, it may be difficult to provide the desired amount of EGR to the cylinders, particularly during transient conditions. This is due to the fact that, by the time the EGR reaches the cylinder, the engine speed/load state may have changed and another EGR rate may be desired.

Thus, in one example, the above issues may be at least partially addressed by a method for controlling EGR flow in a turbocharged engine. The method comprises operating a low-pressure exhaust gas recirculation (LP-EGR) system at a fixed EGR percentage rate of fresh airflow from mid-load down to a minimum engine load, even as load, and thus airflow or air charge, changes.

In this way, as opposed to constantly changing the LP-EGR rate relative to the air, the LP-EGR circuit may have a fixed EGR percentage rate of fresh airflow across an area of the speed/load map, including a minimum engine load corresponding to closed throttle (e.g., due to drive pedal tip-outs). In one embodiment, a constant percent of LP-EGR may be provided in the areas most likely to experience problematic transient control of LP-EGR, such as the minimum load encountered during a driver pedal tip-out event.

The present description may provide several advantages. Because transient control issues may reduce the areas of the speed-load map under which EGR may be utilized effectively, improving transient control may extend the use of EGR under more operating conditions, reducing throttling losses and improving fuel economy. Further, EGR lowers peak cylinder temperatures, reducing the production of NOx. Thus, extending the use of EGR into more areas of the speed-load map may reduce engine-out emissions. Also, operating the LP-EGR circuit with a fixed percentage rate of fresh airflow may improve component durability. For example, not turning LP-EGR on and off during tip-outs and tip-ins reduces the number of thermal cycles on the EGR cooler, improving its durability. Additionally, the number of closing events of the EGR valve may be reduced, improving valve durability. Next, EGR mixing may be improved, as running a consistent LP-EGR amount can allow for optimized sizing of the EGR and air flow ducts to create even dispersion of the EGR into the air. Finally, running fixed LP-EGR may reduce the dynamic range requirements for the EGR valve and sensors and simplify the control strategy for the EGR throttle, reducing system costs and complexity.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 8A and 8B show example diagrams depicting various engine operating parameters during two LP-EGR operating modes, according to embodiments of the present disclosure.

DETAILED DESCRIPTION

The present description relates to an EGR system coupled to a turbocharged engine in a motor vehicle. In one non-limiting example, the engine may be configured as part of the system illustrated in FIG. 1, wherein the engine includes at least one cylinder, a control system, a turbocharger, and an exhaust gas recirculation system, among other features. The engine may be configured with a plurality of cylinder banks as illustrated in FIG. 2. The systems of FIGS. 1 and 2 may be operated with a method such as the examples illustrated in FIGS. 3-6. The various EGR operating modes may be determined by engine-speed load maps, such as one depicted in FIG. 7. FIGS. 8A and 8B illustrate various engine operating parameters during execution of the methods of FIGS. 3-6.

Figure 1:
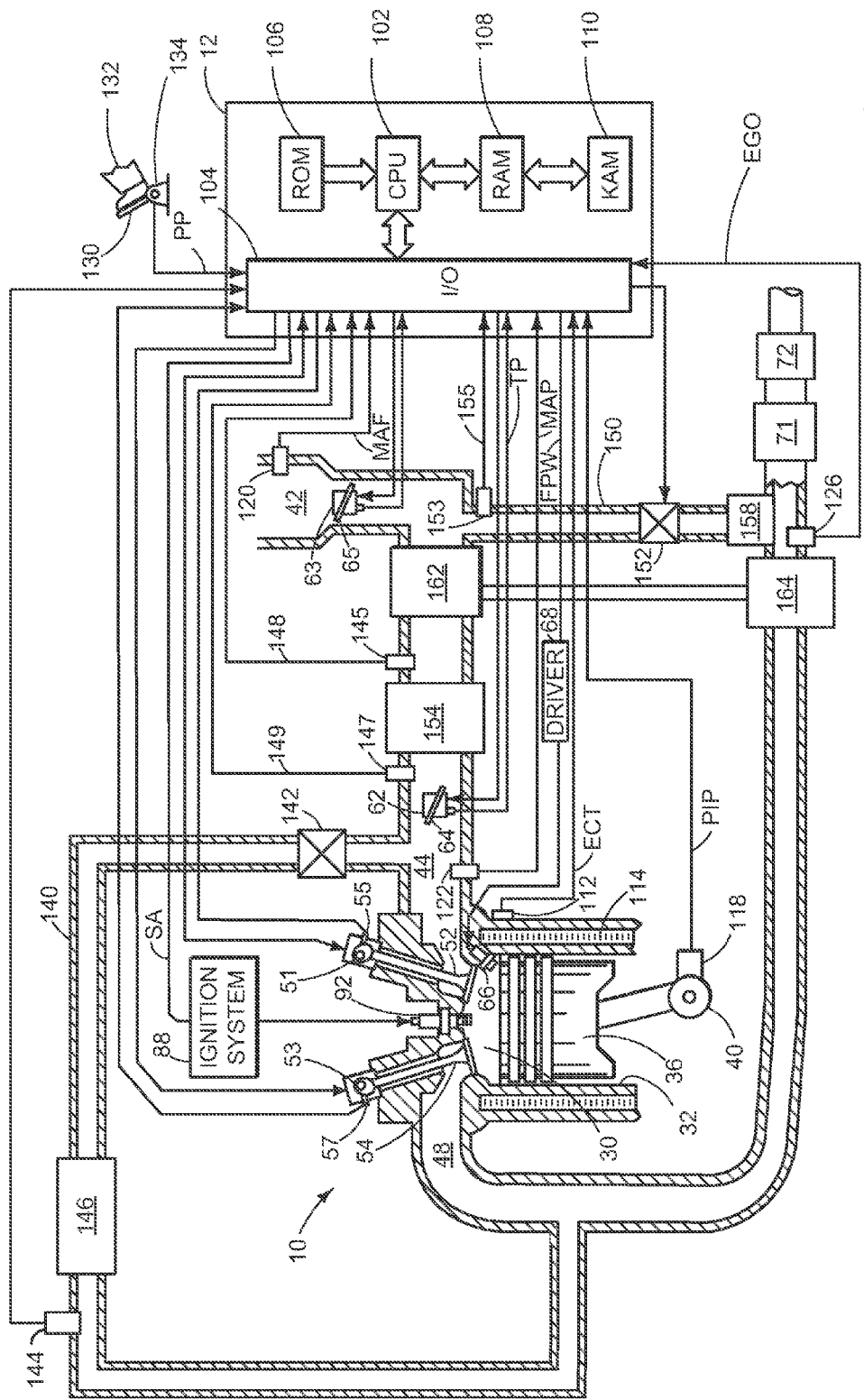
FIG. 1 shows a schematic diagram of an embodiment of an engine with a turbocharger and an exhaust gas recirculation system.
Figure 2:
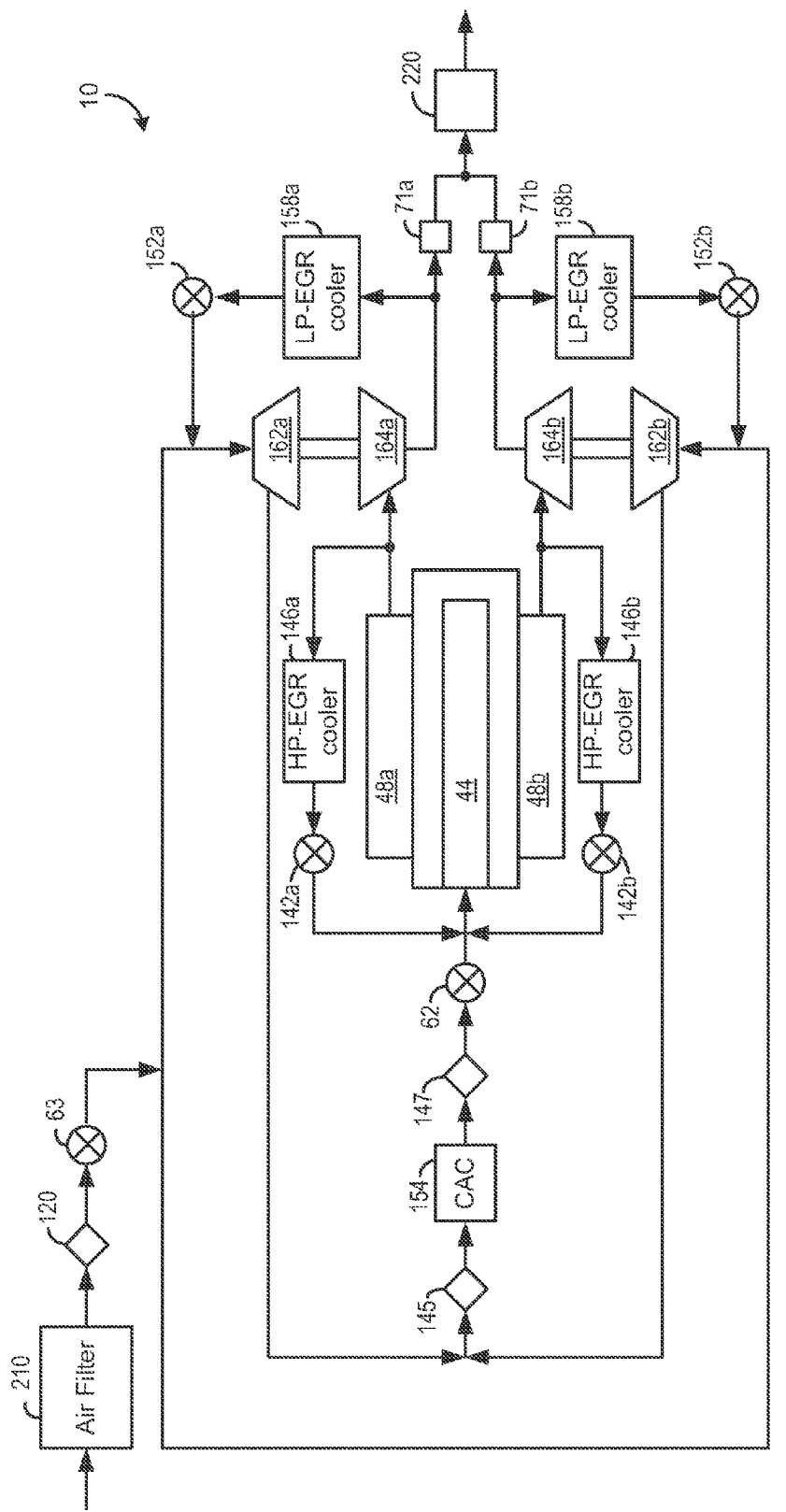
FIG. 2 shows a schematic diagram of an embodiment of an engine with dual cylinder banks, the engine including an exhaust gas recirculation system.

Referring now to FIG. 1, it shows a schematic diagram of one cylinder of multi-cylinder engine 10, which may be included in a propulsion system of an automobile, is shown. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e., cylinder) 30 of engine 10 may include combustion chamber walls 32 with piston 36 positioned therein. In some embodiments, the face of piston 36 inside cylinder 30 may have a bowl. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

Intake valve 52 may be controlled by controller 12 via electric valve actuator (EVA) 51. Similarly, exhaust valve 54 may be controlled by controller 12 via EVA 53. Alternatively, the variable valve actuator may be electro hydraulic or any other conceivable mechanism to enable valve actuation. During some conditions, controller 12 may vary the signals provided to actuators 51 and 53 to control the opening and closing of the respective intake and exhaust valves. The position of intake valve 52 and exhaust valve 54 may be determined by valve position sensors 55 and 57, respectively. In alternative embodiments, one or more of the intake and exhaust valves may be actuated by one or more cams, and may utilize one or more of cam profile switching (CPS), variable cam timing (VCT), variable valve timing (VVT) and/or variable valve lift (VVL) systems to vary valve operation. For example, cylinder 30 may alternatively include an intake valve controlled via electric valve actuation and an exhaust valve controlled via cam actuation including CPS and/or VCT.

Fuel injector 66 is shown coupled directly to combustion chamber 30 for injecting fuel directly therein in proportion to the pulse width of signal FPW received from controller 12 via electronic driver 68. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Intake passage 42 may include throttles 62 and 63 having throttle plates 64 and 65, respectively. In this particular example, the positions of throttle plates 64 and 65 may be varied by controller 12 via signals provided to an electric motor or actuator included with throttles 62 and 63, a configuration that is commonly referred to as electronic throttle control (ETC). In this manner, throttles 62 and 63 may be operated to vary the intake air provided to combustion chamber 30 among other engine cylinders. The positions of throttle plates 64 and 65 may be provided to controller 12 by throttle position signals TP. Pressure, temperature, and mass air flow may be measured at various points along intake passage 42 and intake manifold 44. For example, intake passage 42 may include a mass air flow sensor 120 for measuring clean air mass flow entering through throttle 63. The clean air mass flow may be communicated to controller 12 via the MAF signal.

Engine 10 may further include a compression device such as a turbocharger or supercharger including at least a compressor 162 arranged upstream of intake manifold 44. For a turbocharger, compressor 162 may be at least partially driven by a turbine 164 (e.g., via a shaft) arranged along exhaust passage 48. For a supercharger, compressor 162 may be at least partially driven by the engine and/or an electric machine, and may not include a turbine. Thus, the amount of compression provided to one or more cylinders of the engine via a turbocharger or supercharger may be varied by controller 12. A charge air cooler 154 may be included downstream from compressor 162 and upstream of intake valve 52. Charge air cooler 154 may be configured to cool gases that have been heated by compression via compressor 162, for example. In one embodiment, charge air cooler 154 may be upstream of throttle 62. Pressure, temperature, and mass air flow may be measured downstream of compressor 162, such as with sensor 145 or 147. The measured results may be communicated to controller 12 from sensors 145 and 147 via signals 148 and 149, respectively. Pressure and temperature may be measured upstream of compressor 162, such as with sensor 153, and communicated to controller 12 via signal 155.

Further, in the disclosed embodiments, an EGR system may route a desired portion of exhaust gas from exhaust passage 48 to intake manifold 44. FIG. 1 shows an HP-EGR system and an LP-EGR system, but an alternative embodiment may include only an LP-EGR system. The HP-EGR is routed through HP-EGR passage 140 from upstream of turbine 164 to downstream of compressor 162. The amount of HP-EGR provided to intake manifold 44 may be varied by controller 12 via HP-EGR valve 142. The LP-EGR is routed through LP-EGR passage 150 from downstream of turbine 164 to upstream of compressor 162. The amount of LP-EGR provided to intake manifold 44 may be varied by controller 12 via LP-EGR valve 152. The HP-EGR system may include HP-EGR cooler 146 and the LP-EGR system may include LP-EGR cooler 158 to reject heat from the EGR gases to engine coolant, for example.

Under some conditions, the EGR system may be used to regulate the temperature of the air and fuel mixture within combustion chamber 30. Thus, it may be desirable to measure or estimate the EGR mass flow. EGR sensors may be arranged within EGR passages and may provide an indication of one or more of mass flow, pressure, temperature, concentration of $O_2$, and concentration of the exhaust gas. For example, an HP-EGR sensor 144 may be arranged within HP-EGR passage 140.

In some embodiments, one or more sensors may be positioned within LP-EGR passage 150 to provide an indication of one or more of a pressure, temperature, and air-fuel ratio of exhaust gas recirculated through the LP-EGR passage. Exhaust gas diverted through LP-EGR passage 150 may be diluted with fresh intake air at a mixing point located at the junction of LP-EGR passage 150 and intake passage 42. Specifically, by adjusting LP-EGR valve 152 in coordination with first air intake throttle 63 (positioned in the air intake passage of the engine intake, upstream of the compressor), a dilution of the EGR flow may be adjusted.

A percent dilution of the LP-EGR flow may be inferred from the output of a sensor 145 in the engine intake gas stream. Specifically, sensor 145 may be positioned downstream of first intake throttle 63, downstream of LP-EGR valve 152, and upstream of second main intake throttle 62, such that the LP-EGR dilution at or close to the main intake throttle may be accurately determined. Sensor 145 may be, for example, an oxygen sensor such as a UEGO sensor.

Exhaust gas sensor 126 is shown coupled to exhaust passage 48 downstream of turbine 164. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a $NO_X$, HC, or CO sensor.

Emission control devices 71 and 72 are shown arranged along exhaust passage 48 downstream of exhaust gas sensor 126. Devices 71 and 72 may be a selective catalytic reduction (SCR) system, three way catalyst (TWC), $NO_X$ trap, various other emission control devices, or combinations thereof. For example, device 71 may be a TWC and device 72 may be a particulate filter (PF). In some embodiments, PF 72 may be located downstream of TWC 71 (as shown in FIG. 1), while in other embodiments, PF 72 may be positioned upstream of TWC 72 (not shown in FIG. 1).

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft.

Storage medium read-only memory 106 can be programmed with computer readable data representing instructions executable by processor 102 for performing the methods described below as well as other variants that are anticipated but not specifically listed.

As described above, FIG. 1 shows only one cylinder of a multi-cylinder engine, and that each cylinder may similarly include its own set of intake/exhaust valves, fuel injector, spark plug, etc. In FIG. 2, an example of an engine system including a plurality of cylinder banks and an exhaust gas recirculation system is illustrated. In one embodiment, engine 10 may comprise a turbocharger including compressor 162 and turbine 164, throttle 63 upstream of compressor 162, and a low-pressure exhaust gas recirculation (LP-EGR) system. The LP-EGR system may route EGR from downstream of turbine 164 to upstream of compressor 162 and downstream of throttle 63. The engine system may further comprise a HP-EGR system which routes EGR from upstream of turbine 164 to downstream of throttle 62.

Turning to FIG. 2, air may enter engine 10 through an air filter 210. Air filter 210 may be configured to remove solid particulates from the air so a clean air mass may enter engine 10. The clean air mass flow may be measured as it flows past mass air flow sensor 120 and then through intake throttle 63. The clean air mass flow measured by mass air flow sensor 120 may be communicated to controller 12. In one embodiment, the clean air mass may be split between the different cylinder banks of engine 10 downstream of intake throttle 63 and upstream of turbocharger compressor 162. An EGR system may inject exhaust gas upstream of turbocharger compressor 162 so that a combination of clean air and exhaust gas can be compressed by turbocharger compressor 162. In one embodiment, turbocharger compressor 162 may include a first compressor 162a for a first cylinder bank and a second compressor 162b for a second cylinder bank.

The compressed combination of clean air and exhaust gas downstream of turbocharger compressor 162 may be cooled by a charge air cooler (CAC) 154 upstream of a second throttle 62. In one embodiment, the oxygen content of the airflow downstream from turbocharger compressor 162 may be measured by a sensor 145 upstream of CAC 154. In an alternate embodiment, the oxygen content of the airflow downstream from turbocharger compressor 162 may be measured by a sensor 147 downstream of CAC 154. Measurements from sensors 145 and/or 147 may be communicated to controller 12.

In one embodiment, high pressure exhaust gas may be combined with the compressed combination of clean air and exhaust gas downstream of throttle 62 and upstream of intake manifold 44. The combination of gases may be routed to one or more cylinder banks by intake manifold 44. After combustion in the cylinders, exhaust gas may be routed through exhaust passage 48. In one embodiment, exhaust passage 48 includes an exhaust manifold for each bank of cylinders, such as exhaust manifold 48a for a first cylinder bank and exhaust manifold 48b for a second cylinder bank.

At least a portion of the exhaust gasses may drive a turbine 164 of the turbocharger. In one embodiment, turbine 164 may include a first turbine 164a for a first cylinder bank and a second turbine 164b for a second cylinder bank. In one embodiment, at least a portion of the exhaust gasses may be routed through an HP-EGR system. For example, an HP-EGR system may include HP-EGR cooler 146 and valve 142 for routing cooled exhaust gasses upstream of intake manifold 44. In one embodiment, a HP-EGR system may include a first HP-EGR cooler 146a and valve 142a for a first cylinder bank and a second HP-EGR cooler 146b and valve 142b for a second cylinder bank.

Downstream from turbine 164, at least a portion of the exhaust gasses may flow downstream through emission control device 71 and muffler 220. In one embodiment, emission control device 71 may include a first light-off catalyst 71a for a first cylinder bank and a second light-off catalyst 71b for a second cylinder bank. Muffler 220 may be configured to dampen exhaust noise from engine 10.

At least a portion of the exhaust gasses from downstream of turbine 164 may be routed upstream of turbocharger compressor 162 by an LP-EGR system. For example, an LP-EGR system may include LP-EGR cooler 158 and valve 152 for routing cooled exhaust gasses upstream of compressor 162. In one embodiment, an LP-EGR system may include a first LP-EGR cooler 158a and valve 152a for a first cylinder bank and a second LP-EGR cooler 158b and valve 152b for a second cylinder bank.

Figure 3:
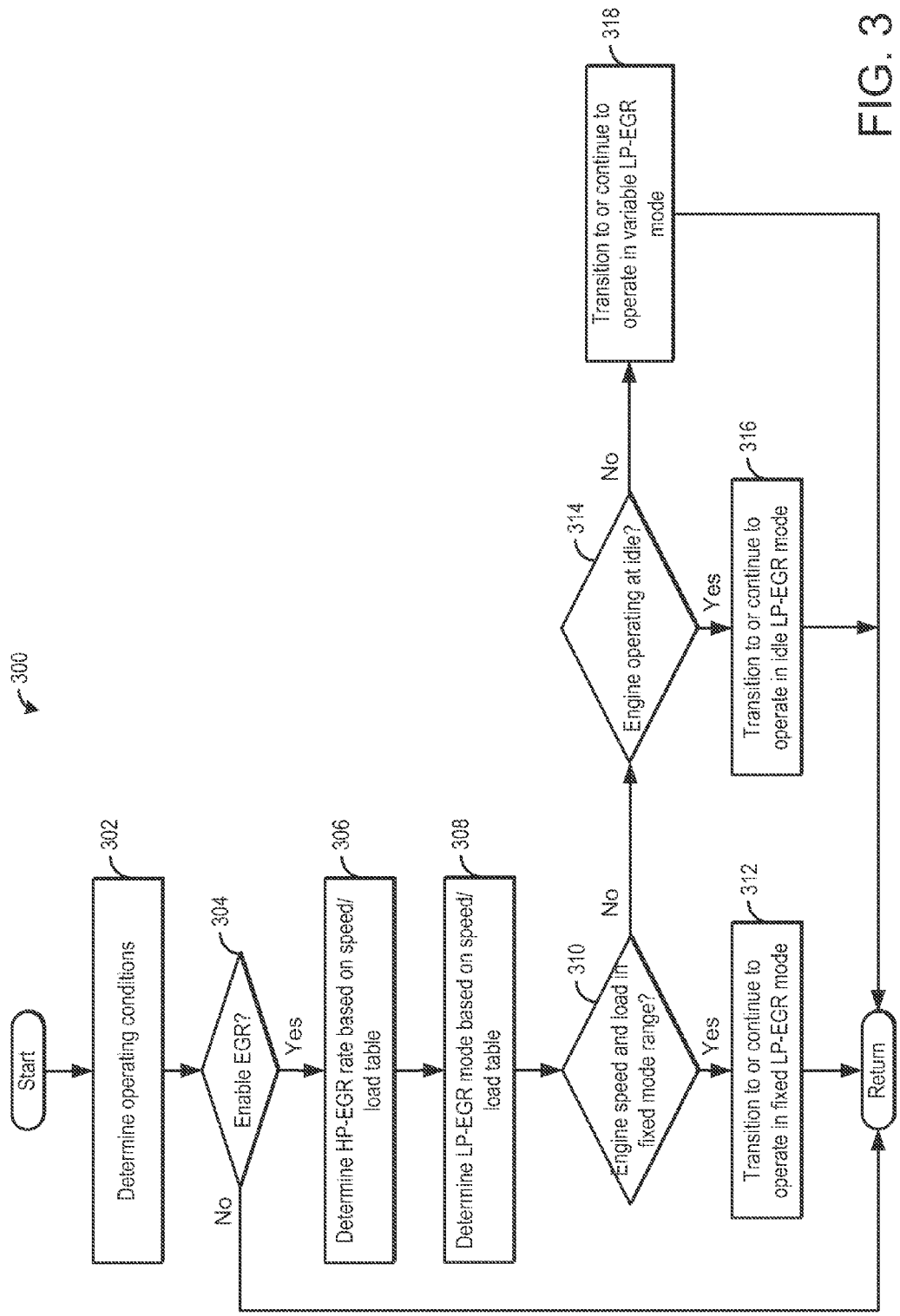
FIG. 3 shows a flow chart depicting an example method for determining an LP-EGR mode.

Thus, engine 10 may comprise both an HP-EGR and an LP-EGR system to route exhaust gases back to the intake. In some embodiments, the LP-EGR system may be controlled to operate under various modes based on engine operating parameters. FIG. 3 is a flow chart illustrating a method 300 for determining an LP-EGR mode. Method 300 may be carried out by controller 12. Method 300 comprises, at 302, determining engine operating conditions. Engine operating conditions such as engine speed, engine load, vehicle speed, engine temperature, etc., may be measured and/or estimated from sensors including throttle position sensor, pedal position sensor, etc. Method 300 then determines whether EGR is to be enabled at 304, based on the engine operating parameters determined at 302. EGR may be disabled when engine temperature is below a threshold, for example, or when the engine has been at idle for an extended period of time.

Figure 7:
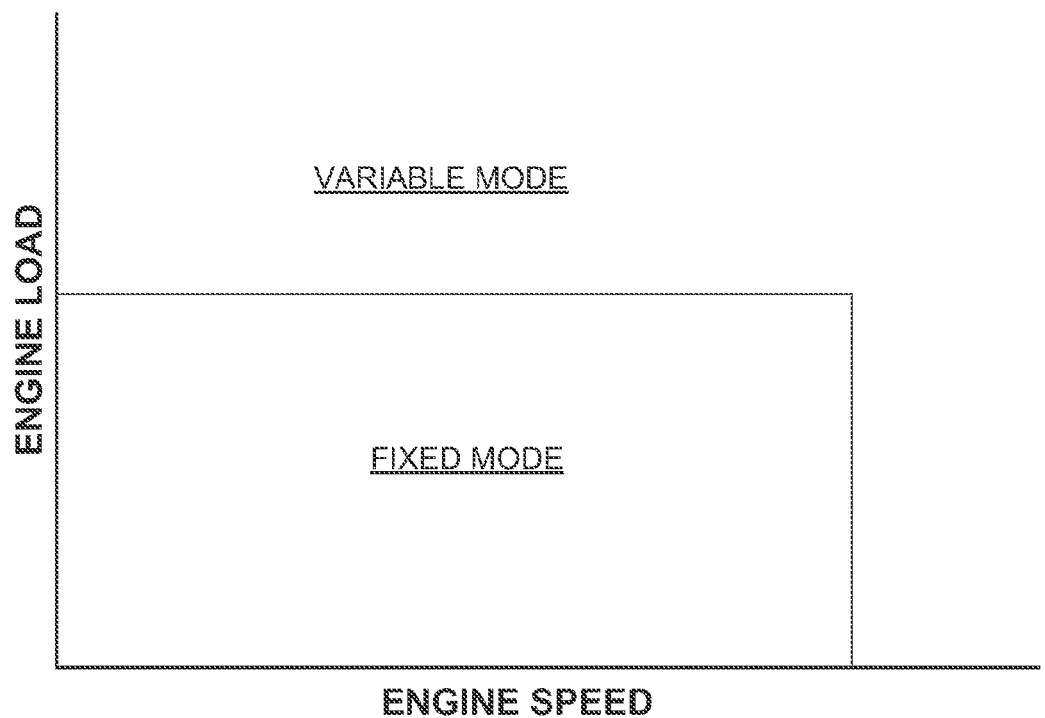
FIG. 7 shows an example speed-load map depicting variable and fixed LP-EGR modes.

If it is determined that EGR is not be enabled, method 300 returns. If it is determined that EGR is to be enabled, method 300 proceeds to 306 to determine an HP-EGR rate based on engine speed and load. The amount of HP-EGR delivered to the intake may be based on an engine-speed load map stored in the memory of controller 12. Method 300 proceeds to 308 to determine an LP-EGR mode based on the operating conditions determined at 302. In some embodiments, the LP-EGR modes may be determined by a speed-load table stored in the memory of controller 12. One example engine speed-load map depicting two LP-EGR operating modes, fixed and variable, is shown in FIG. 7. At 310, it is determined whether engine speed and load are in the fixed mode range. In one embodiment, the fixed mode range comprises all engine loads from mid load down to minimum load, and/or engine speeds lower than a threshold, such as 3500 RPMs. Minimum engine load as described herein comprises the lowest possible load allowable for current operating conditions, e.g. the lowest load that sustains combustion for current engine speed, temperature, etc., and may correspond to a closed throttle engine load for current engine speed conditions. In some conditions, the minimum load may be lower than the load at idle. Thus, the minimum load may be encountered during non-idle conditions and may include the smallest air charge possible for avoiding engine misfire.

If it is determined that engine speed and load are in the fixed mode range, method 300 proceeds to 312 to transition to, or continue to operate in, the fixed LP-EGR mode. An example method for operating in the fixed mode will be described in more detail with regard to FIG. 4 below. If the engine is not operating with speed and load in the fixed range, method 300 proceeds to 314 to determine if the engine is operating at idle. Idle conditions may include engine speed, load, and vehicle speed being below a threshold, as well as brake pedal position past a threshold, transmission in park, etc. If it is determined that the engine is operating at idle, method 300 proceeds to 316 to transition to, or continue operating in, idle LP-EGR mode. An example method for operating in the idle mode will be described in more detail with regard to FIG. 5 below. If the engine is not operating at idle, method 300 proceeds to 318 to transition to, or continue to operate in, variable LP-EGR mode. Variable LP-EGR mode may be enabled at engine speed and loads outside the fixed mode range, and in some embodiments may comprise all engine loads above mid-load (e.g., above 50% load) and all engine speeds above a threshold, such as 3500 RPMs. An example method for operating in the variable mode will be described in more detail below with regard to FIG. 6 below.

Thus, method 300 provides for determining the desired amount of HP-EGR to deliver to the intake based on engine speed and load, and further provides for determining which LP-EGR mode to operate in. The fixed LP-EGR mode may optimize delivery of LP-EGR during problematic transient conditions by continuing to maintain a fixed EGR percentage rate of fresh airflow, that is, maintain a fixed EGR percentage of fresh airflow within the total airflow, which includes the EGR and fresh airflow. By delivering a fixed EGR percentage, potential error may be mitigated in the delivery of the desired amount of LP-EGR due to the transport delay of the LP-EGR system. In some embodiments, the control of the LP-EGR system is maintained independently of the HP-EGR system. Thus, under certain operating conditions, the HP-EGR rate may be varied as speed and/or load change, while the LP-EGR percentage is fixed, even as load changes. Under other conditions, such as during a transition from the fixed to variable mode, the HP-EGR rate may be adjusted in response to the transition.

Figure 4:
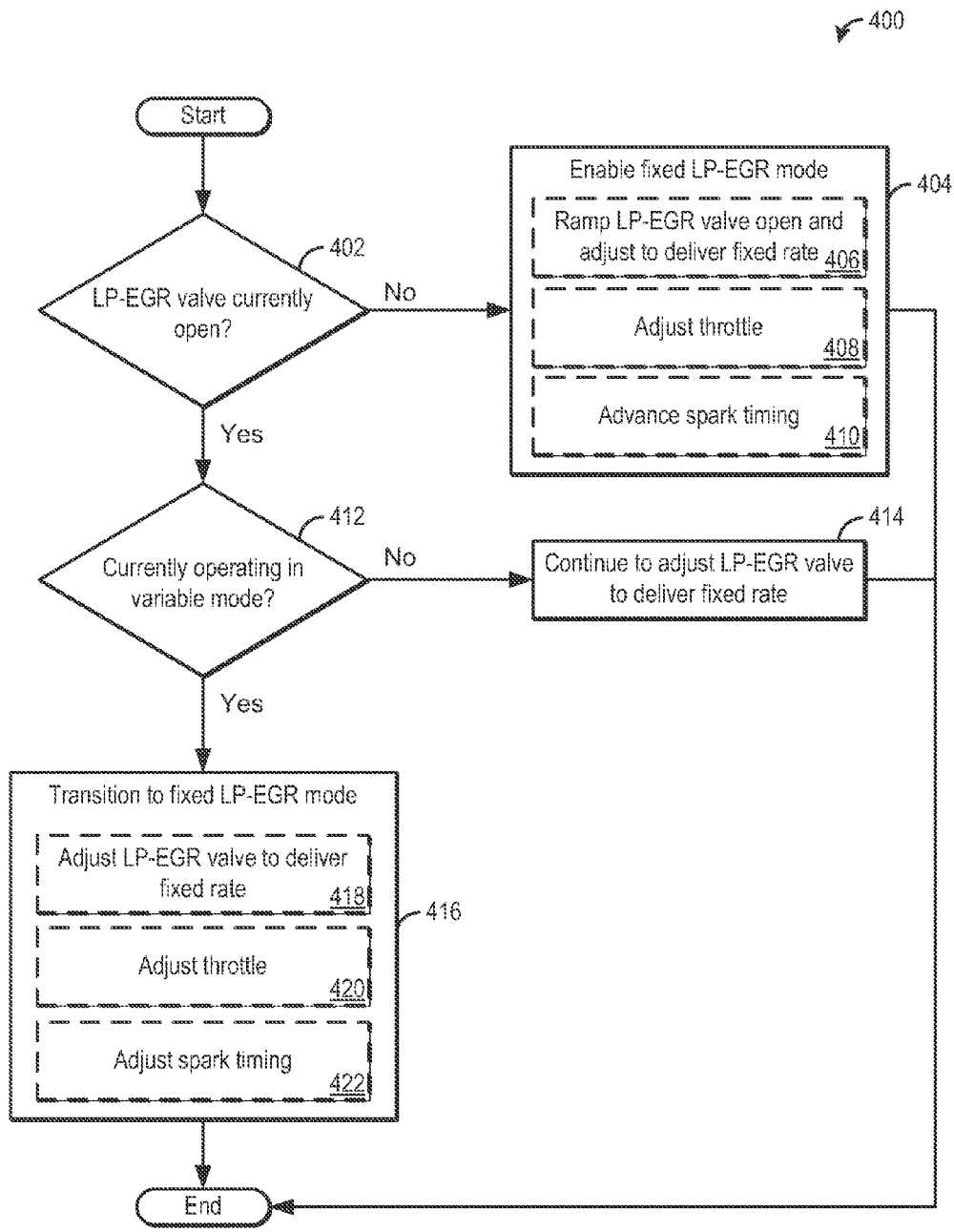
FIG. 4 shows a flow chart depicting a method for transitioning to an idle LP-EGR mode according to an embodiment of the present disclosure.

Turning to FIG. 4, a method 400 for operating in a fixed LP-EGR mode is shown. Method 400 may be carried out by controller 12 in response to a determination to operate in the fixed LP-EGR mode, for example as indicated at 312 in method 300. Method 400 comprises, at 402, determining if an LP-EGR valve, such as valve 152, is open. If it is determined that the LP-EGR valve is not open (for example, if EGR was previously disabled), method 400 proceeds to 404 to enable the fixed LP-EGR mode. Enabling the fixed EGR mode includes, at 406, ramping the LP-EGR valve open and adjusting the valve so that a fixed EGR percentage rate of fresh airflow is maintained. The airflow may be measured in the intake passage downstream of a point where LP-EGR and fresh air mix and upstream of a charge air cooler, such as CAC 154. The percentage EGR of fresh airflow may be determined by an oxygen sensor, such as sensor 145. The LP-EGR valve may be adjusted to deliver an amount of LP-EGR such that the EGR percentage of fresh airflow in the intake passage is maintained at a fixed percentage rate, regardless of engine speed and load changes, while the engine is operating in the fixed mode range. In some embodiments, the fixed EGR percentage rate of fresh airflow may be a total airflow wherein 85% of the airflow comprises fresh air while 15% comprises EGR, while in other embodiments the fresh airflow percentage may be 90%. Any suitable fresh airflow percentage that maintains fuel economy, emissions, combustion stability, and power output at desired levels may be used.

Enabling the fixed LP-EGR mode also includes adjusting the throttle at 408. As the LP-EGR valve is ramped open, the throttle may also be adjusted to provide airflow to maintain torque. For example, if the fixed mode is enabled due to an increase in engine load, the throttle may be opened to provide the desired airflow amount for the load increase. Also, as the amount of LP-EGR increases via the LP-EGR valve opening, the throttle may be opened at a corresponding rate to maintain engine torque at desired levels. Additionally, spark timing may be advanced at 410 to accommodate the increased EGR.

If it is determined at 402 that the LP-EGR valve is currently open, method 400 proceeds to 412 to determine if the engine was previously operating in the variable mode. If the engine was not operating in the variable mode, the engine is therefore currently operating in the fixed mode, and method 400 proceeds to 414 to continue to adjust the LP-EGR valve to maintain a fixed EGR percentage rate of fresh airflow. The LP-EGR valve may be adjusted due to EGR fluctuations resulting from changes in the intake manifold pressure, exhaust back pressure fluctuations, etc.

If it is determined at 412 that the engine was previously operating in the variable mode, method 400 proceeds to 416 to transition to the fixed LP-EGR mode from the variable mode. Transitioning to the fixed mode includes, at 418, adjusting the LP-EGR valve to deliver the fixed EGR percentage rate of fresh airflow. Under some operating conditions, the variable mode may comprise delivering LP-EGR at a rate lower than in the fixed mode, and thus transitioning to the fixed mode would include adjusting the LP-EGR valve to increase the LP-EGR rate. Under other operating conditions, the variable mode may include delivering LP-EGR at a rate higher than in the fixed mode, and thus transitioning to the fixed mode would include adjusting the valve to decrease the LP-EGR rate. The transition also includes adjusting throttle at 420 and adjusting spark timing at 422. Depending on the amount of LP-EGR delivered prior to the transition, the throttle may be opened or closed. For example, if the amount of EGR is increased, the throttle position may be moved so that the throttle is more open; if the amount of EGR is decreased, the throttle may be moved to more of a closed position. Similarly, spark timing may be advanced or retarded, dependent upon the previous EGR percentage.

Figure 5:
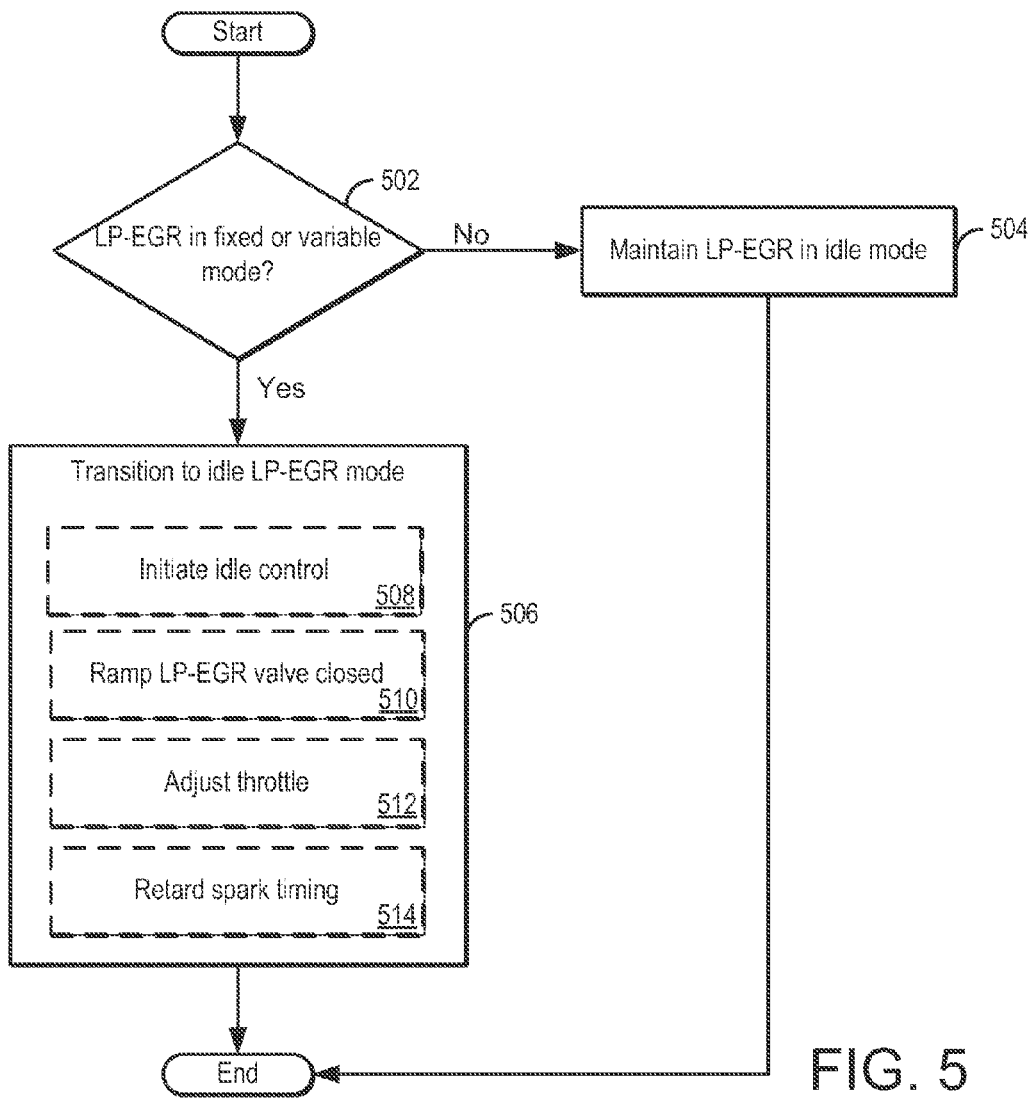
FIG. 5 shows a flow chart depicting a method for transitioning to a fixed LP-EGR mode according to an embodiment of the present disclosure.

FIG. 5 illustrates a method 500 for operating in an idle LP-EGR mode. Method 500 may be carried out by controller 12 in response to a determination to operate in the idle LP-EGR mode, for example as indicated at 316 in method 300. Method 500 comprises, at 502, determining if the engine was previously operating in the fixed or variable LP-EGR mode. If it is determined that the engine was not previously operating in either the fixed or the variable mode, method 500 proceeds to 504 to maintain the engine in the idle LP-EGR mode. In some embodiments, the idle LP-EGR mode comprises blocking airflow through the LP-EGR system, and thus the LP-EGR valve will be closed while in the idle mode. In other embodiments, the idle LP-EGR mode comprises delivering a reduced EGR percentage rate of fresh airflow relative to the EGR percentage maintained during the fixed mode. If it is determined that the engine was previously operating in either the fixed or the variable mode, method 500 proceeds to 506 to transition to the idle LP-EGR mode. Transitioning to the idle LP-EGR mode includes initiating idle control at 508. Idle control may comprise an additional system to maintain the engine at idle speed based on auxiliary loading of the engine. In some embodiments, idle control may include electrically adjusting the throttle valve opening to admit the desired airflow to maintain idle speed. In other embodiments, the airflow needed for idle operation may be provided via a throttle bypass. The idle control at 508 is initiated while the engine is still in the fixed or variable mode. Once the idle control begins, the LP-EGR valve is ramped closed at 510, the throttle is adjusted at 510, and spark timing may be retarded at 512.

Figure 6:
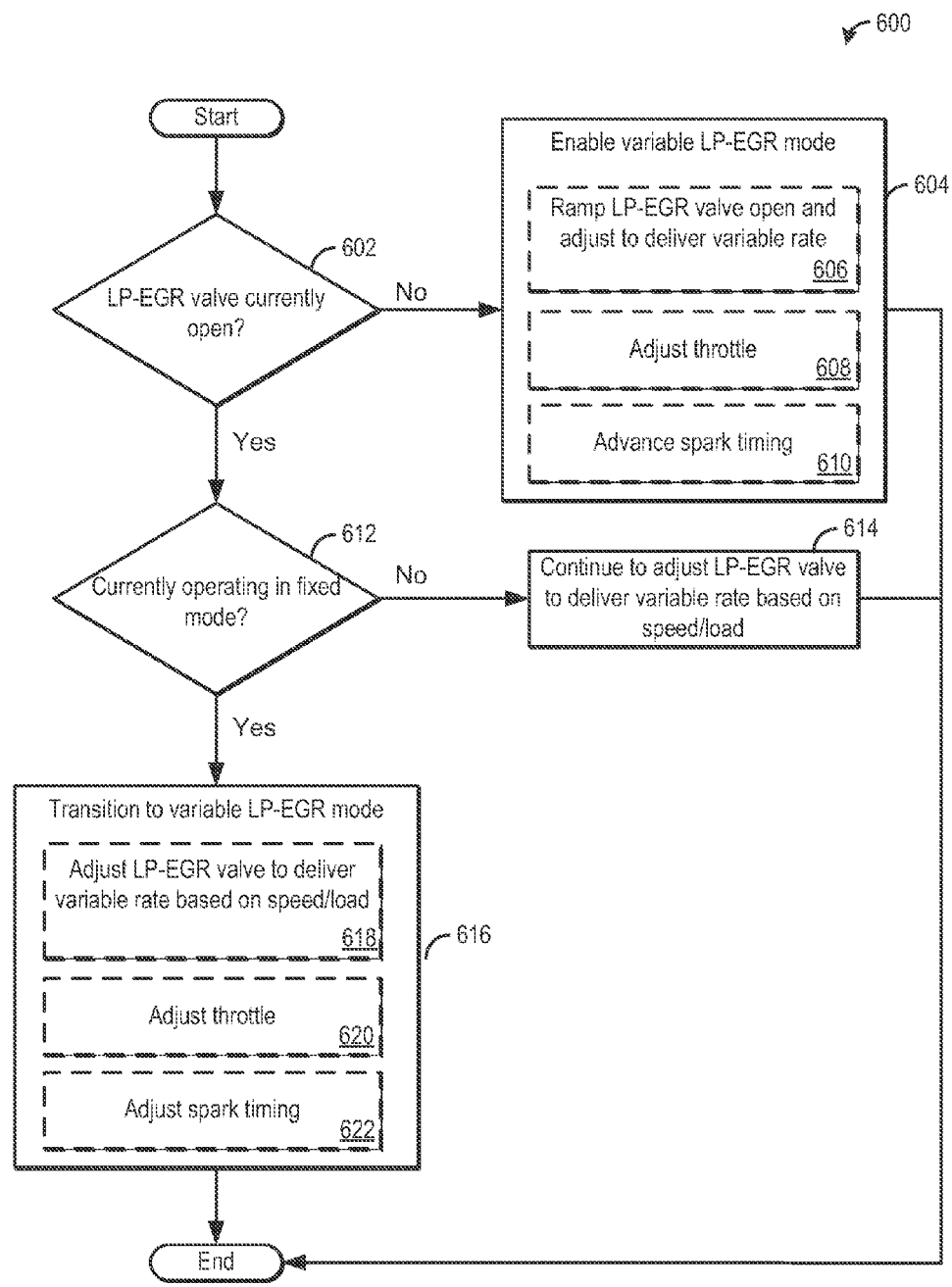
FIG. 6 shows a flow chart depicting a method for transitioning to a variable LP-EGR mode according to an embodiment of the present disclosure.

Turning to FIG. 6, a method 600 for operating in a variable LP-EGR mode is shown. Method 600 may be carried out by controller 12 in response to a determination to operate in the variable LP-EGR mode, for example as indicated at 318 in method 300. Method 600 comprises, at 602, determining if an LP-EGR valve, such as valve 152, is open. If it is determined that the LP-EGR valve is not open (for example, if EGR was previously disabled), method 600 proceeds to 604 to enable the variable LP-EGR mode. Enabling the variable EGR mode includes, at 606, ramping the LP-EGR valve open and adjusting the valve so that the desired EGR percentage rate of fresh airflow is maintained. The LP-EGR valve may be adjusted to deliver an amount of LP-EGR such that the EGR percentage rate of fresh airflow in the intake passage is varied based on engine speed and load changes.

Enabling the variable LP-EGR mode also includes adjusting the throttle at 608. As the LP-EGR valve is ramped open, the throttle may also be opened to admit the desired LP-EGR airflow. Additionally, spark timing may be advanced at 610 to facilitate additional time for cylinder combustion.

If it is determined at 602 that the LP-EGR valve is currently open, method 600 proceeds to 612 to determine if the engine was previously operating in the fixed mode. If the engine was not operating in the fixed mode, the engine is therefore currently operating in the variable mode, and method 600 proceeds to 614 to continue to adjust the LP-EGR valve to deliver a variable EGR percentage rate of fresh airflow, based on engine speed and load. If it is determined at 612 that the engine was previously operating in the fixed mode, method 600 proceeds to 616 to transition to the variable LP-EGR mode from the fixed mode. Transitioning to the variable mode includes, at 618, adjusting the LP-EGR valve to deliver the desired EGR percentage rate of fresh airflow. Under some operating conditions, the variable mode may comprise delivering LP-EGR at a rate lower than in the fixed mode, and thus transitioning to the variable mode may include adjusting the LP-EGR valve to decrease the LP-EGR rate. Under other operating conditions, the variable mode may include delivering LP-EGR at a rate higher than in the fixed mode, and thus transitioning to the variable mode would include adjusting the valve to increase the LP-EGR rate. The transition also includes adjusting the throttle at 620 and adjusting spark timing at 622. Depending on the desired amount of LP-EGR delivered prior to the transition, the throttle may be opened or closed. Similarly, spark timing may be advanced or retarded, dependent upon the previous EGR percentage.

Therefore, the methods depicted in FIGS. 3-6 provide for operation in the three LP-EGR modes, fixed, idle and variable, and also provide for transitioning between any of the operating modes. By enabling operation in the three modes, dependent on engine operating conditions such as engine speed and load, the EGR percentage rate of fresh airflow may be maintained at a desired amount. In one embodiment, the LP-EGR system may be operated in the fixed mode, that is at a fixed EGR percentage rate of fresh airflow, from at least mid-load down to a minimum engine load, even as load changes. In one example, the system may be operated in the fixed mode in the full load range, from full load corresponding to a wide open throttle condition down to minimum load corresponding to a closed throttle position.

Operation in the fixed mode may particularly allow for minimization of LP-EGR rate errors during problematic transient conditions, such as during a sudden increase or decrease in load. These temporary load changes traditionally necessitated an adjustment in the LP-EGR rate in order to maintain combustion stability, for example, or maintain peak power output. However, the fixed LP-EGR mode continues to deliver a fixed EGR percentage rate of fresh airflow, even down to minimum engine load, such as engine load at closed throttle. In some embodiments, various engine parameters may be adjusted to allow for the LP-EGR to remain fixed and yet avoid combustion instability. Additional actions including high energy ignition, enhanced charge motion, and/or higher compression ratios, may be used to provide acceptable combustion stability at low load points. For example, under low load and/or speed conditions, charge motion control valves may be adjusted to increase the speed and swirl of air entering the combustion chambers, improving combustion, while systems including variable ignition energy capabilities may be controlled to increase ignition energy at low load to improve ignition.

Turning to FIGS. 8A and 8B, exemplary engine operating parameters during two modes of LP-EGR operation are depicted. FIG. 8A illustrates example pedal position 810, throttle position 820, vehicle speed 830, engine speed 840, and engine load 850 traces according to an embodiment of the present disclosure. Each trace depicts time along the x-axis, and depicts each respective operating parameter on the y-axis, from zero at the bottom to maximum at the top. At the start of the traces, engine load, engine speed, and vehicle speed are in the low to mid range under steady state conditions, with pedal position and throttle position maintained at a constant position. At 802, the vehicle operator initiates a "tip-in" event by depressing the accelerator pedal, and as a result, the throttle opens more, and engine load, engine speed, and vehicle speed all increase. At 804, a "tip-out" event occurs when the operator lets up on the pedal, and throttle, vehicle speed, load and engine speed return to their original position and rates.

At 806, another tip-out event occurs, and vehicle speed drops. At this speed, the throttle moves to a substantially closed throttle position, and engine load is at minimum load. Vehicle speed eventually drops to zero at 808, and the engine begins to operate at idle, e.g., engine speed and load are below a threshold and vehicle speed is at zero.

FIG. 8B illustrates example total air charge 860, LP-EGR flow rate 870, and LP-EGR percentage 880 traces during the engine operating conditions described above with respect to FIG. 8A. Total air charge comprises all air flowing through the LP-EGR system and includes both fresh airflow from the intake and EGR. The LP-EGR flow rate comprises the rate of LP-EGR mass flowing through the system. The LP-EGR percentage includes the relative amount of EGR flow comprising the total airflow, that is, the percentage of LP-EGR within the total air charge.

The air charge, LP-EGR flow, and LP-EGR percentage are maintained at a constant amount until 802, when the operator initiates the tip-in. While both engine load and engine speed increased at 802 (as described with respect to FIG. 8A), they are still at a level that is within the fixed mode range, and as a result, the EGR percentage remains constant, due to the engine operating the fixed mode. Similarly, at 804, both total air charge and EGR flow decrease at the tip-out, and the EGR percentage remains at the fixed amount. At 806, when engine load drops to the minimum engine load corresponding to a substantially closed throttle position, the EGR percentage still remains at the fixed amount, and the air charge and EGR flow decrease. At 808, when the vehicle begins to operate in the idle mode, EGR flow ends as the LP-EGR valve ramps closed, and the EGR percentage drops to zero.

As can be seen from FIGS. 8A and 8B, maintaining the fixed EGR percentage rate of fresh air includes coordinating adjustment of the LP-EGR valve and the throttle using feed-forward control, and includes feedback adjustment to maintain the percentage based on the EGR rate measurement from, e.g., an intake oxygen sensor. This includes changing both the intake airflow rate and the EGR flow rate in a coordinated way such that the EGR percentage is maintained at a constant percentage. As errors in the control may be present, maintaining the constant percentage may include some small variation in the EGR percentage, e.g., 1-2% variation. During the fixed mode, when airflow increases, such as during the tip-in event at 802, the LP-EGR valve is adjusted to provide a corresponding increase in EGR flow to maintain the fixed EGR percentage.

Note that the example control and estimation routines included herein can be used with various engine and/or vehicle system configurations. The specific methods and routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of controlling EGR flow in a turbocharged, spark-ignited engine, comprising:
    operating a low-pressure exhaust gas recirculation (LP-EGR) system at a fixed EGR percentage rate of fresh airflow from mid-load down to a minimum engine load, even as load changes; and
    adjusting a high-pressure exhaust gas recirculation (HP-EGR) rate based on a transition of the LP-EGR system between the fixed EGR percentage rate and a variable EGR percentage rate.

2. The method of claim 1, wherein the minimum engine load corresponds to a closed throttle position.

3. The method of claim 1, further comprising operating the LP-EGR system at the variable EGR percentage rate of fresh airflow at mid to high engine loads.

4. The method of claim 1, further comprising adjusting the high-pressure exhaust gas recirculation (HP-EGR) rate based on engine speed and load while maintaining the fixed EGR percentage rate of the LP-EGR system.

5. The method of claim 1, further comprising operating the LP-EGR system at the variable EGR percentage rate of fresh airflow when engine speed is above a threshold.

6. The method of claim 1, further comprising, when the engine is at idle, reducing the fixed EGR percentage rate to an idle EGR percentage rate that is less than the fixed EGR percentage rate.

7. The method of claim 6, wherein the minimum engine load is a lowest possible load allowable for current operating conditions that sustains the minimum load lower than a load at idle.

8. A method for operating a spark-ignition engine, comprising:
    during an idle mode, blocking exhaust gas recirculation (EGR) flow through a low-pressure exhaust gas recirculation (LP-EGR) system;
    during a fixed mode, operating the LP-EGR system to maintain a fixed EGR percentage rate of fresh airflow at all engine loads within a first range;

during a variable mode, operating the LP-EGR system to deliver a variable EGR percentage rate of fresh airflow based on a second range of engine speed and load; and operating a high-pressure exhaust gas recirculation (HP-EGR) system based on engine speed and load during each of the fixed and variable modes.

9. The method of claim 8, wherein the first load range comprises mid-load down to minimum load, and where the fixed mode is exclusive of the idle mode, with the first range including engine loads down to loads corresponding to a closed throttle condition.

10. The method of claim 8, wherein the variable mode is enabled at mid to high engine loads and/or at engine speeds above a threshold.

11. The method of claim 8, further comprising during a transition from the idle mode to the fixed or variable modes, ramping an LP-EGR valve open to deliver a desired EGR percentage rate of fresh airflow while correspondingly ramping an intake throttle to maintain torque.

12. The method of claim 11, further comprising during a transition from the fixed or variable mode to the idle mode, initiating idle speed control while in the fixed or variable mode, and maintaining idle speed control while ramping the LP-EGR valve closed, and adjusting the intake throttle to maintain idle speed and torque.

13. A system for a spark-ignition engine of a vehicle, comprising:
a turbocharger coupled to the spark-ignition engine;
a high-pressure exhaust gas recirculation (HP-EGR) system including a HP-EGR valve;
a low pressure exhaust gas recirculation (LP-EGR) system including a LP-EGR valve, the LP-EGR system configured to operate under an idle, fixed, or variable modes; and
a control system comprising a computer readable storage medium comprising instructions for:
during the fixed mode, controlling operation of the LP-EGR valve to maintain a fixed EGR percentage rate of fresh airflow of LP-EGR through the LP-EGR system at all engine loads within a first load range; and
controlling operation of the HP-EGR valve based on engine speed and load during each of the fixed and variable modes of the LP-EGR system.

14. The system of claim 13, wherein the first load range is mid-load to minimum load, the minimum engine load corresponding to a closed throttle position.

15. The system of claim 13, wherein the instructions further comprise, during the idle mode, closing the LP-EGR valve.

16. The system of claim 13, wherein the instructions further comprise, during the variable mode, operating the LP-EGR valve to deliver a variable EGR percentage rate of fresh airflow.

17. The system of claim 16, wherein the variable EGR percentage rate is based on engine speed and load.

18. The system of claim 16, wherein the instructions further comprise controlling operation of the HP-EGR valve based on a transition between the fixed and variable modes.

* * * * *